March 31, 1964     H. R. WILSON ETAL     3,126,762
DUAL PERFORMANCE TORQUE CONVERTER TRANSMISSION
Filed April 28, 1961
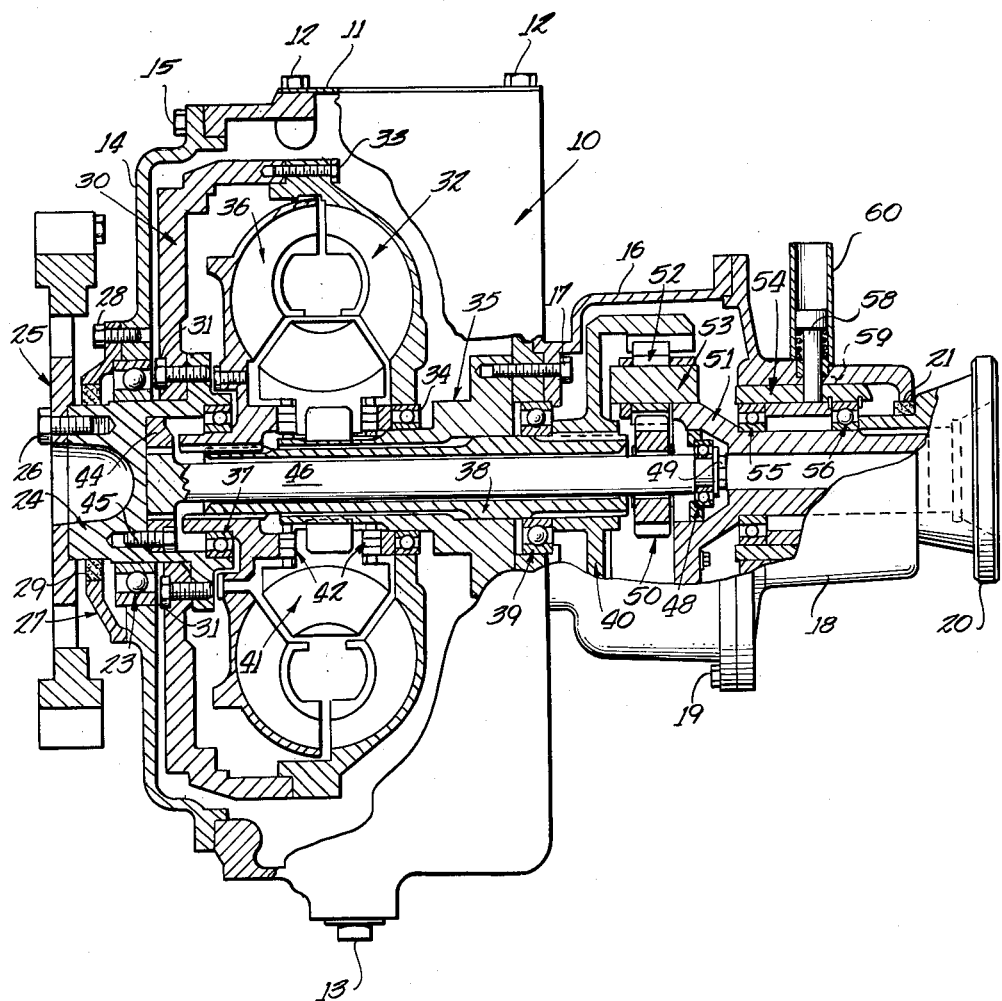
INVENTORS
HARRY R. WILSON
HORST G. STEINHAGEN
Paul O. Pippel
ATTORNEY United States Patent Office 3,126,762
Patented Mar. 31, 1964

3,126,762
DUAL PERFORMANCE TORQUE CONVERTER
TRANSMISSION
Harry R. Wilson and Horst G. Steinhagen, Libertyville, Ill., assignors to The Frank G. Hough Co., a corporation of Illinois
Filed Apr. 28, 1961, Ser. No. 106,408
3 Claims. (Cl. 74—688)

This invention relates to a hydrodynamic torque converter transmission having two different performance characteristics, and more particularly to a manually adjustable gear arrangement combined with a hydrodynamic torque converter to provide a transmission having two selective substantially different torque absorption characteristics.

This invention has particular application to multi-purpose earth-moving machines such as a vehicle which by a substitution of tools may operate either as a front-end type tractor loader or as an earth-moving scraper or dozer. When such a multi-purpose machine is used as a front-end type tractor loader, a portion of the available engine torque is generally used to operate a hydraulic system for the loader. If the converter is capable of absorbing relatively large amounts of the available engine torque, a problem of engine stalling occurs when the loader hydraulic system is operated while the converter is connected to drive the traction members under conditions of heavy digging. When such a machine is used as an earth-moving scraper or dozer, the engine is not required to additionally drive a hydraulic system, and therefore the converter having high torque absorption characteristics is desirable. Generally the problems with such machines have been solved by substituting different converters when different tools are used, since the torque absorption characteristics of the converter may be changed by a different construction of the pump or impeller wheel of the converter. With a definite need in the earth-moving art for rapid and simple interchangeability of tools, the substitution of converters is an unsatisfactory choice.

It is the object of the present invention to provide a torque converter transmission in which in one adjusted condition the transmission would provide for a relatively high torque output at the stall speed of the transmission but with relatively low torque absorption characteristics, and which would provide in another adjusted condition a relatively high torque output at substantially medium and higher transmission speed ratios with substantially high torque absorption characteristics.

It is a further object of this invention to provide a torque converter transmission arrangement for a vehicle which is convertible to operate either as a front-end type hydraulically operated tractor loader or an earth scraper wherein the converter arrangement may be conditioned for the loader operation to provide relatively high torque multiplication at the stall speed of the converter but with relatively low torque absorption characteristics and which may be conditioned when the machine is operated as an earth scraper to provide a relatively high torque output of the converter arrangement at converter speeds from the middle to the high ranges thereof.

Other objects and features of the present invention will be apparent upon a perusal of the following specification and drawing of which:

The figure is a longitudinally partially cross-sectional view of a torque converter arrangement constructed according to the present invention.

The present embodiment is the preferred embodiment but it is to be understood that changes can be made in the present embodiment by one skilled in the art without departing from the spirit and scope of the present invention.

For a general description of the present invention reference is made to the drawing. A planetary set is connected to the hydrodynamic torque converter so that the turbine wheel of the converter always drives the ring gear of the planetary set, the output from the converter and gearing arrangement is taken from the planet pinion gear carrier, and the sun gear of the planetary set is selectively connectable to either the turbine wheel of the converter or the flywheel of the engine. With the sun gear of the planetary set connected to the turbine wheel of the converter, the planetary set is locked up and the engine torque is delivered from the converter pump or impeller wheel to the turbine wheel and therefrom to the sun gear and ring gear of the planetary set, and in turn to the carrier of the output member. When the sun gear of the planetary set is connected to the flywheel of the engine, a portion of the available engine torque is delivered to drive the sun gear of the planetary set with the remaining engine torque driving the pump wheel, in turn driving the turbine wheel, and in turn driving the ring gear of the planetary set. The output at the carrier of the planetary set is then a combination of a direct mechanical drive from the engine and the hydrodynamic drive from the converter. In both arrangements the output speed is substantially the same. The shifting between the two operated positions of the present invention is accomplished by a sliding shaft extending through the center of the converter and having splines formed on the input end thereof which may be meshed with either internal splines on the flywheel of the engine or internal splines in the hub of the turbine wheel of the converter. The sun gear of the planetary set is keyed to the other end of the sliding shaft. The end of the sliding shaft adjacent the sun gear is rotatively carried by the planet carrier, and a manual arrangement is provided for longitudinally shifting the planet carrier to thereby longitudinally shift the sliding shaft. The teeth of the ring gear are of a width sufficient to maintain engagement with the planet pinion gears when the planet carrier, the sliding shaft, the sun gear and the planet pinion gears are shifted between the two adjusted positions of the present invention. The planet carrier is shifted longitudinally by means of a hand lever carried in a helical slot through the output shaft housing and secured to a cylindrical carrier for the planet gear carrier. The arrangement of the invention is one wherein the torque converter will produce relatively high torque multiplication at the stall speed of the converter but with relatively low absorption characteristics when the subject invention is used to power the traction means of a machine constructed as a front-end-type tractor loader. A relatively high output torque will be produced when the machine is constructed as an earth scraper with the drive to the planetary set being both mechanical and hydrodynamic under which condition substantially the full available engine torque may be absorbed by the traction means.

Turning next to a detailed description of the present invention continued reference is made to the drawing. The transmission housing 10 contains and carries the converter and associated gearing. Housing 10 being of any suitable construction known in the art. The present embodiment of the housing 10 comprises a central section having a cover plate 11 secured at the top thereof by fasteners 12 and with an oil sump portion formed in the lower end thereof with a suitable drain 13. A front cover plate 14 is secured to the central section by bolts 15. A rearward planetary carrying section 16 is secured to the central section by bolts such as bolts 17. The rearwardmost section 18 of the housing 10 is secured over the rearward open end of the planetary section 16 by bolts 19. The output member or shaft 20 is carried through an opening in the rearwardmost section 18 and is sealed against the linkage of oil by the oil seal 21.

The forward section 14 of the housing 10 is provided with an opening therethrough and carries the ball bearing set 23 of the input or drive shaft 24. The input shaft 24 is secured to the flywheel 25 of the engine (not shown) by bolts such as bolt 26. A cover plate 27 positioned about the input shaft 24 and rearwardly of the flywheel 25 is secured to the forward section 14 of the housing 10 by bolts such as bolt 28. The cover plate 28 is provided with an oil seal 29.

The casing 30 of the torque converter is secured to the input shaft 24 by bolts 31. The vaned pump or impeller wheel 32 of the converter is secured to the converter casing 30 by bolts such as bolts 33. The casing 30 is filled with a suitable fluid. The pump wheel 32 is rotatably carried on a ball bearing set 34 which in turn is carried on a cylindrical shaft 35 which is fixed to the housing 10. The vaned turbine wheel 36 is rotatably supported within the converter casing 30 by a ball bearing set 37. The hub portion of the turbine wheel 36 is carried by the inner race of the roller bearing set 37 and the outer race of the ball bearing set 37 is carried in an enlarged portion of the input shaft 24. The hub of the turbine wheel 36 is internally splined for drivingly engaging one end of the cylindrical shaft 38. The shaft 38 is rotatably carried through one wall of the housing 10 by a roller bearing set 39. The end of the shaft 38 extending into the housing section 16 is splined for drivingly carrying the ring gear 40. The reaction or stator wheel 41 of the converter is rotatably carried on the inner end of the cylindrical shaft 35 between the pump wheel 32 and the turbine wheel 36. One-way clutches 42 disposed between the pump wheel 32 and the turbine wheel 36 permit the stator wheel 41 to freely rotate in one direction while preventing any rotation in the opposite direction.

To provide mechanical drive to the sun gear of the planetary set, the input shaft 24 is provided with a member 44 which is secured thereto by a bolt 45. The member 44 is provided with internal splines substantially of the size of the splines in the hub of the turbine wheel 36. The hub of the turbine wheel 36 is provided with a portion thereof not in engagement with the member 38 and which extends toward member 44. The shaft 46 is positioned through the shaft 38 and at the end thereof adjacent the input shaft 24 is provided with splines which are engageable with either the splines of the member 44 or the extending splined hub section of the turbine wheel 36. The other end of the shaft 46 is provided with a ball bearing set 48 which is secured thereon by a nut 49. The sun gear 50 of the planetary set is keyed to the shaft 46 inwardly of the end carrying the ball bearing set 48. The outer race of the ball bearing set 48 is supported in the hub portion of the planet pinion gear carrier 51. The planet pinion carrier 51 carries three planet pinion gears 52, one of which is shown in the drawing. Each of the planet pinion gears 52 is journalled on a shaft 53 which is carried by the carrier 51, and each of the planet pinion gears 52 meshes with the sun gear 50 and the ring gear 40. The planet pinion carrier 51 is rotatably supported in a sleeve 54 by two sets of ball bearings 55 and 56. The sleeve 54, the ball bearing sets 55 and 56, and the pinion gear carrier 51 are so assembled that the carrier 51 is freely rotatable about its axis of rotation, relative to the sleeve 54, but is prevented from any endwise movement relative to the sleeve 54. The end of the shaft 46 is constrained within the hub portion of the carrier 51 in a similar manner, in that the shaft 46 may rotate relative to the carrier 51 but is prevented from any endwise movement relative thereto. The output member 20 is secured to the end of the carrier 51.

The sleeve 54 is moved longitudinally of the axis of shaft 46 and carrier 51 by the manual displacement of the pin 58 in the slot 59. The slot 59 is helically disposed through the housing member 18, and the pin 58 extends through the slot 59 and into a hole in the sleeve 54. The slot 59 has an enlarged portion at each end thereof for retaining the lower end of the handle 60 to lock the pin 58 in either extreme position. The handle 60 is spring-biased toward the housing section 18. As may be seen from the drawing, the sleeve 54 is shown in the position wherein the shaft 46 is splined to the member 44 on the input shaft 24. If the handle 60 is raised against the bias of the spring to remove the lower portion of the handle from the enlarged portion of the slot 59, the handle may then be rotated in a direction which may be described as into the drawing. Because of the helical disposition of the slot 59, the described rotation of the handle 60 will cause a longitudinal displacement of the pin 58. The pin 58 will then slide the sleeve 54 toward the output end of the transmission, and the sleeve 54 will in turn longitudinally displace the planet carrier 51. In the longitudinal displacement of the planet carrier 51, the planet pinion gears 52 will be displaced along the teeth of the ring gear 40 but not out of engagement therewith due to the substantial width of those teeth. The longitudinal displacement of the carrier 51 will cause a corresponding movement of the shaft 46, and the shaft 46 will disengage the member 44 on the input shaft 24 and will engage the spline in the hub of the turbine wheel 36.

In describing the operation of the instant invention continued reference is made to the drawing. Considering first the operated position shown in the drawing, that in which the subject transmission is intended to be used in an earth scraping or dozing operation, the engine, through the flywheel 25, will drive the input shaft 24. The input shaft 24 in turn will drive the pump wheel 32 of the converter and the shaft 46. The pump wheel 32 will drive the turbine wheel 36, and the turbine wheel in turn will drive the ring gear 40 through the shaft 38. The shaft 46 will drive the sun gear 50. The output member 20 will be driven by the pinion gear carrier 51 which in turn will be driven by both the ring gear 40 and sun gear 50 acting through the planet pinion gears 52. With this arrangement the output torque will be relatively high at engine speeds from a medium engine speed and above. Substantially full available engine torque may be absorbed.

Considering next the other operated position of the instant invention, that wherein the shaft 46 is splined within the hub of the turbine wheel 36, the engine will drive the input shaft 24 which will in turn drive the pump wheel 32 of the converter. The pump wheel 32 will drive the turbine wheel 36 and the turbine wheel 36 will drive the shafts 38 and 46. Since the shafts 38 and 46 in this position are both splined within the hub of the turbine wheel 36, the sun gear 50 and the ring gear 40 will be prevented from relatively rotating and the planetary set will be locked up as a unit. The carrier 51 will then be driven without any rotation of the planet pinion gears 52 about the axes of shafts 53. Thus in this operated condition of the subject invention the drive to the output member 20 is purely hydrodynamic. High torque multiplication at the stall speed of the converter will be provided but with relatively low absorption characteristic so that the engine may also deliver power to a loader structure with a substantially reduced risk of stalling of the engine under heavy digging conditions when both the loader and the traction means are operated.

Having described the invention what is considered new and desired to be protected by Letters Patent is:

1. In a transmission, a drive shaft, a hydrodynamic torque converter comprising a fluid filled casing and vaned impeller drivingly connected to said drive shaft, and relatively rotatable, vaned, turbine and reaction members mounted in said casing to provide a closed toroidal fluid circuit, a planetary set of a sun gear, a ring gear, and a plurality of planet pinion gears engaging said sun gear and ring gear and supported by a planet pinion gear carrier, a cylindrical shaft extending into said casing along the axis of rotation of said impeller and terminating adjacent to said drive shaft, means connecting said cylindrical shaft to be driven by said turbine member, means connecting said ring gear of said planetary set to be driven by said cylindrical shaft, means slidably carrying said planet pinion gear carrier along the axis of rotation thereof, said ring gear being formed to have teeth of a width sufficient to engage said planet pinion gears in any longitudinal position of said planet pinion gear carrier relative to said ring gear, an output shaft connected to be driven by said planet pinion gear carrier, a sliding shaft carried through said cylindrical shaft and drivingly carrying said sun gear of said planetary set, means carrying one end of said sliding shaft on said planet pinion gear carrier for longitudinal movement of said sliding shaft by said carrier and for relative rotation therebetween, means on said turbine member and said drive shaft formed to respectively drivingly engage the other end of said sliding shaft when said sliding shaft is positioned in cooperation therewith, and manual means for sliding said planet pinion gear carrier to longitudinally move said sliding shaft to one position wherein said drive shaft drivingly engages said sliding shaft to rotate independently of said cylindrical shaft and to a second position wherein said turbine member drivingly engages said sliding shaft, and said sliding shaft and said cylinder shaft are locked together with said planetary set for rotation.

2. In a transmission as claimed in claim 1 wherein said means on said turbine member and said drive shaft formed to respectively drivingly engage said sliding shaft comprises an internally splined section on said drive shaft coaxial with and of said substantially the same size as an internally splined section on said turbine member and wherein said other end of said sliding shaft is formed to have a splined portion engageable with the internal splined sections of said drive shaft and said turbine member.

3. In a transmission, a drive shaft, a hydrodynamic torque converter comprising a fluid filled casing and vaned impeller drivingly connected to said drive shaft, and relatively rotatable, vaned, turbine and reaction members mounted in said casing to provide a closed toroidal fluid circuit, a planetary set of three members, a cylindrical shaft extending into said casing along the axis of rotation of said impeller and terminating adjacent to said drive shaft, means connecting said cylindrical shaft to be driven by said turbine member, means connecting one member of said planetary set to be driven by said cylindrical shaft, means slidably carrying the second member of said planetary set along the axis of rotation thereof, an output shaft connected to be driven by said second planetary member, a sliding shaft carried through said cylindrical shaft and drivingly carrying the third member of said planetary set, means carrying one end of said sliding shaft on said second member of said planetary set for longitudinal movement of said sliding shaft by said second member and for relative rotation therebetween, means on said turbine member and said drive shaft formed to respectively drivingly engage the other end of said sliding shaft when said sliding shaft is positioned in cooperation therewith, and manual means for sliding said second planetary member to longitudinally move said sliding shaft to one position wherein said drive shaft drivingly engages said sliding shaft to rotate independently of said cylinder shaft and to a second position wherein said turbine member drivingly engages said sliding shaft, and said sliding shaft and said cylindrical shaft are locked together with said planetary set for rotation.

References Cited in the file of this patent
UNITED STATES PATENTS
2,149,117    Dodge et al. _____ Feb. 28, 1939